US012578552B2

(12) United States Patent　　　　(10) Patent No.:　US 12,578,552 B2
Zhu et al.　　　　　　　　　　　　　(45) Date of Patent:　　Mar. 17, 2026

(54) OPTICAL IMAGING LENS

(71) Applicant: Genius Electronic Optical (Xiamen) Co., Ltd., Xiamen (CN)

(72) Inventors: Qingzhi Zhu, Xiamen (CN); Songchao Huang, Xiamen (CN); Meiting He, Xiamen (CN); Hung-Chien Hsieh, Taichung City (TW)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 314 days.

(21) Appl. No.: 18/143,607

(22) Filed: May 5, 2023

(65) Prior Publication Data

US 2024/0280788 A1　　Aug. 22, 2024

(30) Foreign Application Priority Data

Feb. 21, 2023　(CN) .......................... 202310145596.3

(51) Int. Cl.
　　*G02B 13/00*　　(2006.01)
　　*G02B 9/06*　　(2006.01)
　　*G02B 9/10*　　(2006.01)
　　*G02B 13/14*　　(2006.01)

(52) U.S. Cl.
　　CPC ............. *G02B 13/003* (2013.01); *G02B 9/06* (2013.01); *G02B 9/10* (2013.01); *G02B 13/14* (2013.01)

(58) Field of Classification Search
　　CPC .......... G02B 13/003; G02B 9/06; G02B 9/10; G02B 13/14; G02B 9/04
　　USPC .................................................... 359/793–795
　　See application file for complete search history.

(56) References Cited

U.S. PATENT DOCUMENTS

| 2011/0249170 | A1* | 10/2011 | Tsai | ..................... | G02B 13/003 |
| | | | | | 348/340 |
| 2013/0265658 | A1* | 10/2013 | Tsai | ..................... | G02B 13/003 |
| | | | | | 359/793 |

* cited by examiner

*Primary Examiner* — George G. King
(74) *Attorney, Agent, or Firm* — Winston Hsu

(57)　　　　　ABSTRACT

An optical imaging lens includes a first lens element to a second lens element. The first lens element to the second lens element each having an object-side surface facing toward the object side and allowing imaging rays to pass through as well as an image-side surface facing toward the image side and allowing the imaging rays to pass through. A periphery region of the image-side surface of the first lens element is convex, an optical axis region of the image-side surface of the second lens element is concave. Lens elements included by the optical imaging lens are only the two lens elements mentioned above, and the following conditions: HFOV*T1/(ImgH*Fno)≥12.000, T1/T2≥1.300 are satisfied.

19 Claims, 22 Drawing Sheets

A1 ⇐—　　　　　　　　　　　　　　　　　—⇒A2

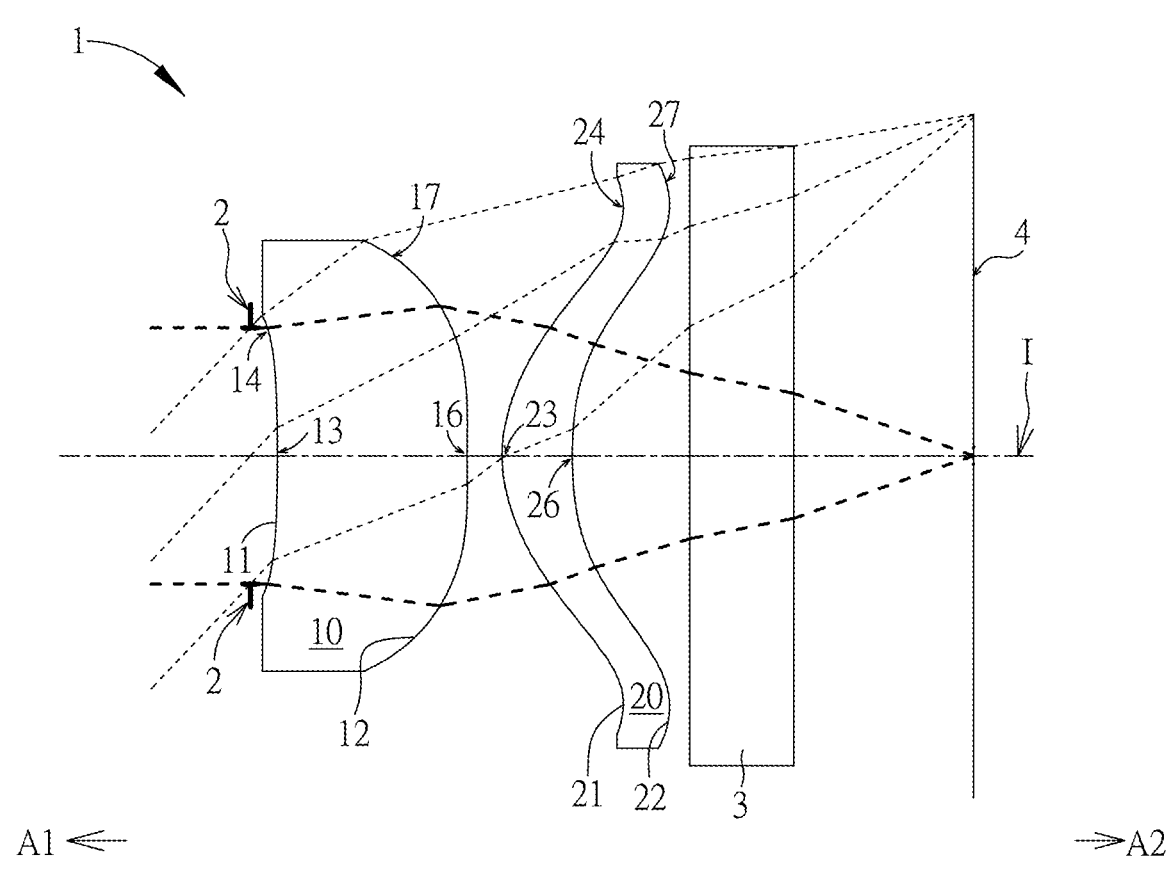
FIG. 6
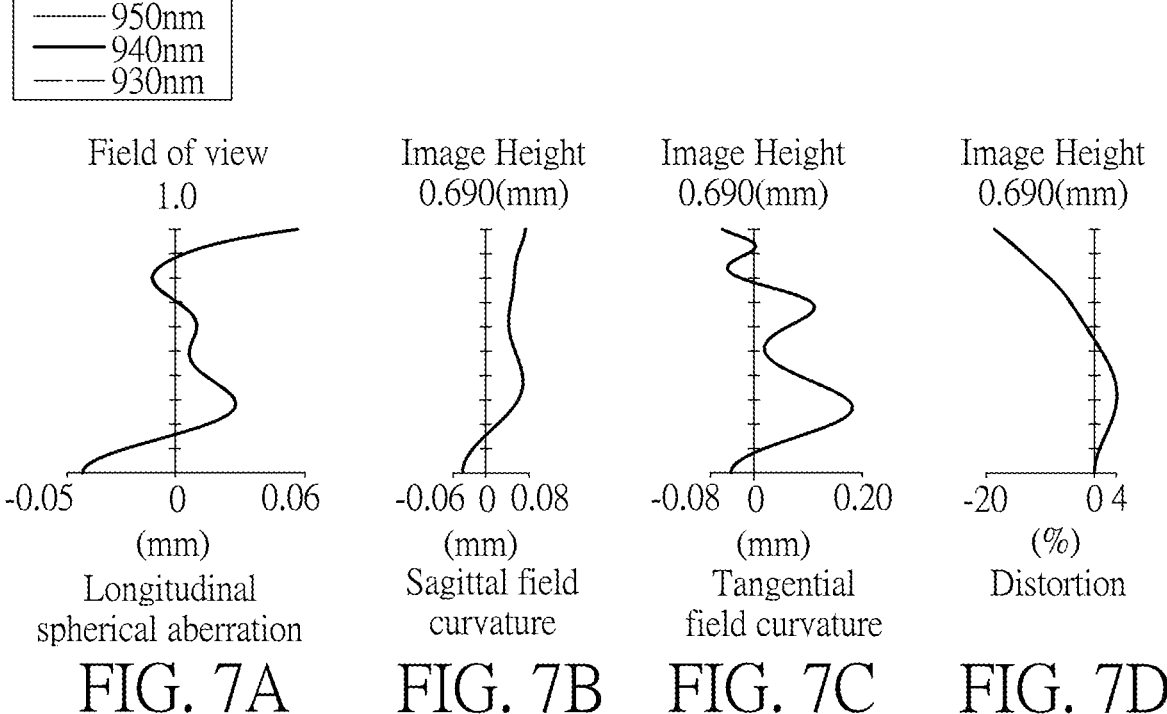
Field of view
1.0
Image Height
0.690(mm)
Image Height
0.690(mm)
Image Height
0.690(mm)
-0.05    0    0.06
(mm)
Longitudinal
spherical aberration
FIG. 7A
-0.06  0 0.08
(mm)
Sagittal field
curvature
FIG. 7B
-0.08   0   0.20
(mm)
Tangential
field curvature
FIG. 7C
-20   0 4
(%)
Distortion
FIG. 7D

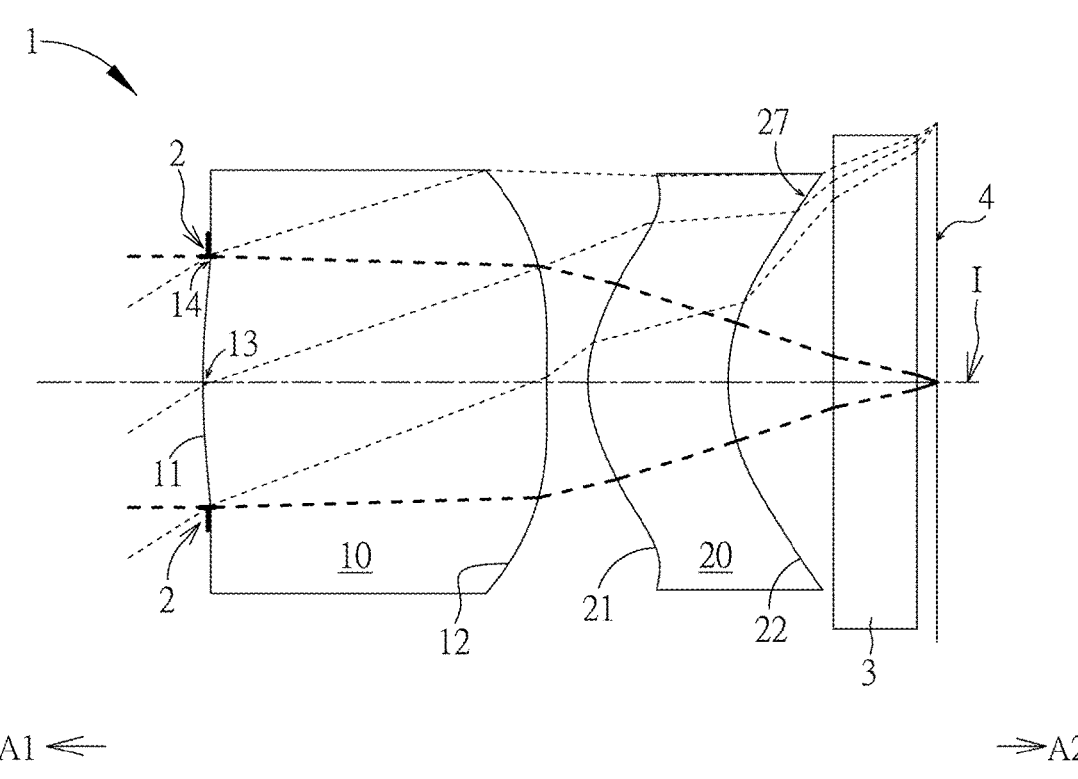
FIG. 14
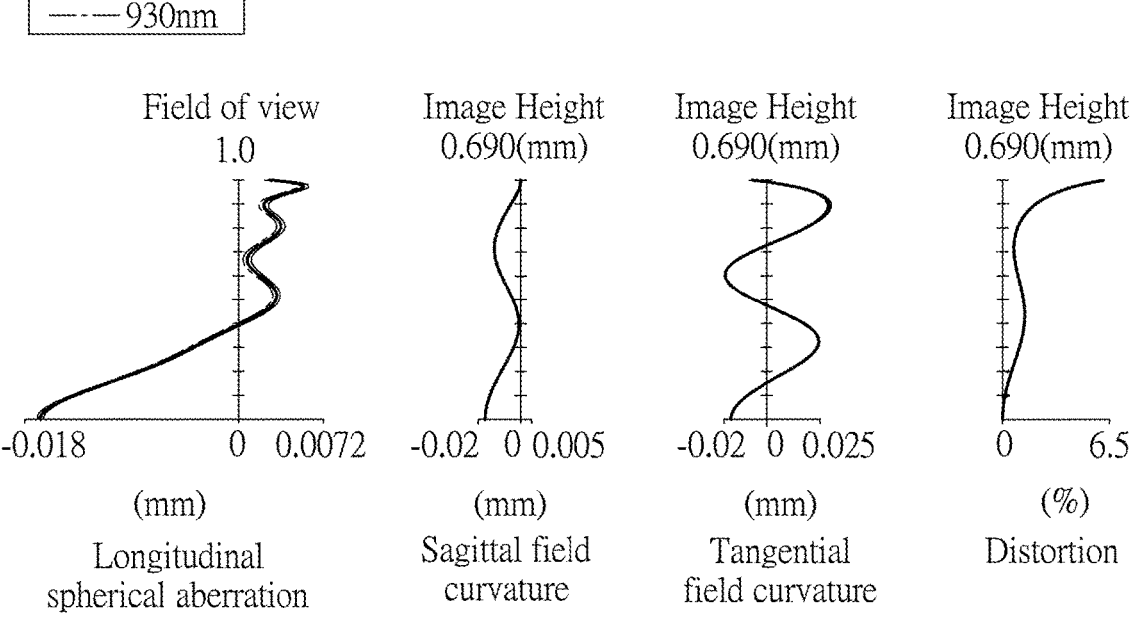
| Field of view 1.0 | Image Height 0.690(mm) | Image Height 0.690(mm) | Image Height 0.690(mm) |
|---|---|---|---|
| -0.018   0   0.0072 | -0.02   0   0.005 | -0.02   0   0.025 | 0    6.5 |
| (mm) | (mm) | (mm) | (%) |
| Longitudinal spherical aberration | Sagittal field curvature | Tangential field curvature | Distortion |
| FIG. 15A | FIG. 15B | FIG. 15C | FIG. 15D |

| No. | | Radius of Curvature (mm) | Ape. Stop Distance Thickness Air Gap (mm) | | Material | nd Refractive Index | Vd Abbe No. | Focal Length (mm) |
|---|---|---|---|---|---|---|---|---|
| | | | First Embodiment | | | | | |
| | | EFL=0.776mm; HFOV=46.637degrees; TTL=1.404mm; Fno=1.500; ImgH=0.690mm | | | | | | |
| | Object | Infinity | Infinity | | | | | |
| 2 | Ape. Stop | Infinity | 0.054 | | | | | |
| 11 | First lens element | -3.611 | 0.383 | T1 | Plastic | 1.671 | 19.480 | -2.910 |
| 12 | | 4.054 | 0.070 | G12 | | | | |
| 21 | Second lens element | 0.292 | 0.142 | T2 | Plastic | 1.642 | 22.409 | 0.644 |
| 22 | | 0.885 | 0.237 | G2F | | | | |
| 3 | Filter | Infinity | 0.210 | | | 1.512 | 62.574 | |
| | | Infinity | 0.363 | | | | | |
| 4 | Image Plane | Infinity | | | | | | |

FIG. 18

| No. | K | $a_4$ | $a_6$ | $a_8$ | $a_{10}$ |
|---|---|---|---|---|---|
| 11 | 1.025813E+01 | -6.688282E+00 | 1.130177E+03 | -8.071512E+04 | 2.842293E+06 |
| 12 | -4.283390E+01 | -1.714446E+01 | 3.070127E+02 | -5.638516E+03 | 6.446880E+04 |
| 21 | -8.109787E+00 | 1.441425E+01 | -1.744340E+02 | 1.420885E+03 | -7.302684E+03 |
| 22 | -2.021007E-02 | 9.366706E+00 | -6.283935E+01 | 1.498809E+02 | -1.329575E+02 |
| No. | $a_{12}$ | $a_{14}$ | $a_{16}$ | $a_{18}$ | $a_{20}$ |
| 11 | -5.399466E+07 | 5.034728E+08 | -8.755689E+08 | -2.012068E+10 | 1.120619E+11 |
| 12 | -3.173894E+05 | -8.985519E+05 | 1.848189E+07 | -8.156717E+07 | 1.233422E+08 |
| 21 | 1.630475E+04 | 2.864613E+04 | -2.773637E+05 | 6.698885E+05 | -5.793650E+05 |
| 22 | -3.456465E+02 | 2.870851E+03 | -1.407540E+04 | 3.720496E+04 | -3.739346E+04 |

FIG. 19

| No. | | Radius of Curvature (mm) | Ape. Stop Distance Thickness Air Gap (mm) | | Material | nd Refractive Index | Vd Abbe No. | Focal Length (mm) |
|---|---|---|---|---|---|---|---|---|
| | | | Second Embodiment | | | | | |
| | | | EFL=0.805mm; HFOV=41.477degrees; TTL=1.426mm; Fno=1.732; ImgH=0.690mm | | | | | |
| | Object | Infinity | Infinity | | | | | |
| 2 | Ape. Stop | Infinity | 0.054 | | | | | |
| 11 | First lens element | 2.266 | 0.431 | T1 | Plastic | 1.671 | 19.480 | 13.756 |
| 12 | | 2.818 | 0.123 | G12 | | | | |
| 21 | Second lens element | 0.344 | 0.237 | T2 | Plastic | 1.642 | 22.409 | 0.789 |
| 22 | | 0.853 | 0.237 | G2F | | | | |
| 3 | Filter | Infinity | 0.210 | | | 1.512 | 62.574 | |
| | | Infinity | 0.189 | | | | | |
| 4 | Image Plane | Infinity | | | | | | |

FIG. 20

| No. | K | $a_4$ | $a_6$ | $a_8$ | $a_{10}$ |
|---|---|---|---|---|---|
| 11 | -1.125287E+01 | -6.849455E+00 | 1.148534E+03 | -8.047502E+04 | 2.834293E+06 |
| 12 | 2.832019E+01 | -1.442575E+01 | 3.033975E+02 | -5.860273E+03 | 6.521224E+04 |
| 21 | -1.199373E+01 | 1.196926E+01 | -1.768685E+02 | 1.450114E+03 | -7.471650E+03 |
| 22 | -1.246499E+01 | 7.466468E+00 | -6.093654E+01 | 1.617668E+02 | -1.117538E+02 |
| No. | $a_{12}$ | $a_{14}$ | $a_{16}$ | $a_{18}$ | $a_{20}$ |
| 11 | -5.399321E+07 | 5.044520E+08 | -8.723483E+08 | -2.026373E+10 | 1.126025E+11 |
| 12 | -3.118789E+05 | -9.064994E+05 | 1.834927E+07 | -8.176910E+07 | 1.258236E+08 |
| 21 | 1.510780E+04 | 2.830305E+04 | -2.510389E+05 | 7.829888E+05 | -1.500094E+06 |
| 22 | -3.974619E+02 | 2.646461E+03 | -1.418710E+04 | 3.833908E+04 | -3.920146E+04 |

FIG. 21

| No. | | Radius of Curvature (mm) | Ape. Stop Distance Thickness Air Gap (mm) | | Material | nd Refractive Index | Vd Abbe No. | Focal Length (mm) |
|---|---|---|---|---|---|---|---|---|
| colspan 9 | Third Embodiment | | | | | | | |
| colspan 9 | EFL=0.812 mm; HFOV=40.069degrees; TTL=1.457mm; Fno=1.500; ImgH=0.690mm | | | | | | | |
| | Object | Infinity | Infinity | | | | | |
| 2 | Ape. Stop | Infinity | 0.046 | | | | | |
| 11 | First lens element | -3.838 | 0.459 | T1 | Plastic | 1.671 | 19.480 | 0.936 |
| 12 | | -0.545 | 0.319 | G12 | | | | |
| 21 | Second lens element | 0.362 | 0.133 | T2 | Plastic | 1.642 | 22.409 | -49.806 |
| 22 | | 0.308 | 0.237 | G2F | | | | |
| 3 | Filter | Infinity | 0.210 | | | 1.512 | 62.574 | |
| | | Infinity | 0.099 | | | | | |
| 4 | Image Plane | Infinity | | | | | | |

FIG. 22

| No. | K | $a_4$ | $a_6$ | $a_8$ | $a_{10}$ |
|---|---|---|---|---|---|
| 11 | -7.834214E+00 | 1.240802E+00 | 7.875679E+02 | -7.443802E+04 | 2.827283E+06 |
| 12 | -8.809682E+01 | -2.072224E+01 | 4.534391E+02 | -7.005906E+03 | 5.905222E+04 |
| 21 | -6.575658E+00 | 8.554715E+00 | -1.643478E+02 | 1.432662E+03 | -7.321910E+03 |
| 22 | -2.132092E+00 | -8.571074E-01 | -1.933998E+01 | 1.324582E+02 | -3.676010E+02 |
| No. | $a_{12}$ | $a_{14}$ | $a_{16}$ | $a_{18}$ | $a_{20}$ |
| 11 | -5.460087E+07 | 5.013229E+08 | -7.906515E+08 | -1.944469E+10 | 1.023492E+11 |
| 12 | -1.270746E+05 | -2.198597E+06 | 2.118241E+07 | -7.655799E+07 | 1.030803E+08 |
| 21 | 1.637206E+04 | 2.849375E+04 | -2.788428E+05 | 6.788931E+05 | -5.947781E+05 |
| 22 | -2.399005E+02 | 4.563686E+03 | -1.355561E+04 | 1.944623E+04 | -1.193171E+04 |

FIG. 23

| | | | Fourth Embodiment | | | | | |
|---|---|---|---|---|---|---|---|---|
| | | EFL=0.821 mm; HFOV=42.740degrees; TTL=1.540mm; Fno=1.500 ; ImgH=0.690mm | | | | | | |
| No. | | Radius of Curvature (mm) | Ape. Stop Distance Thickness Air Gap (mm) | | Material | nd Refractive Index | Vd Abbe No. | Focal Length (mm) |
| | Object | Infinity | Infinity | | | | | |
| 2 | Ape. Stop | Infinity | 0.034 | | | | | |
| 11 | First lens element | -43.549 | 0.417 | T1 | Plastic | 1.573 | 37.666 | 2.559 |
| 12 | | -1.392 | 0.255 | G12 | | | | |
| 21 | Second lens element | 0.399 | 0.293 | T2 | Plastic | 1.545 | 55.987 | 1.161 |
| 22 | | 0.828 | 0.237 | G2F | | | | |
| 3 | Filter | Infinity | 0.210 | | | 1.512 | 62.574 | |
| | | Infinity | 0.128 | | | | | |
| 4 | Image Plane | Infinity | | | | | | |

FIG. 24

| No. | K | $a_4$ | $a_6$ | $a_8$ | $a_{10}$ |
|---|---|---|---|---|---|
| 11 | 3.895263E-06 | 4.235759E-01 | 6.358106E+02 | -5.946724E+04 | 2.291393E+06 |
| 12 | -9.888226E+01 | -1.084182E+01 | 2.073759E+02 | -3.318407E+03 | 2.842701E+04 |
| 21 | -2.641777E+01 | 1.569176E+01 | -2.497846E+02 | 2.532503E+03 | -1.663856E+04 |
| 22 | -1.133653E+00 | 3.940098E+00 | -4.287551E+01 | 2.739718E+02 | -9.830349E+02 |
| No. | $a_{12}$ | $a_{14}$ | $a_{16}$ | $a_{18}$ | $a_{20}$ |
| 11 | -4.628504E+07 | 4.920303E+08 | -2.220477E+09 | -1.824077E+09 | 3.505997E+10 |
| 12 | -5.789409E+04 | -1.112892E+06 | 1.044491E+07 | -3.708752E+07 | 4.904766E+07 |
| 21 | 6.996644E+04 | -1.831170E+05 | 2.751667E+05 | -1.915644E+05 | 2.207671E+04 |
| 22 | 9.058797E+02 | 5.618384E+03 | -2.135316E+04 | 2.979252E+04 | -1.540649E+04 |

FIG. 25

| No. | | Radius of Curvature (mm) | Ape. Stop Distance Thickness Air Gap (mm) | | Material | nd Refractive Index | Vd Abbe No. | Focal Length (mm) |
|---|---|---|---|---|---|---|---|---|
| | | | | Fifth Embodiment | | | | |
| | | | EFL=0.950 mm; HFOV=32.499degrees; TTL=1.851mm; Fno=1.500; ImgH=0.650mm | | | | | |
| | Object | Infinity | Infinity | | | | | |
| 2 | Ape. Stop | Infinity | -0.013 | | | | | |
| 11 | First lens element | 1.982 | 0.868 | T1 | Plastic | 1.671 | 19.480 | 5.389 |
| 12 | | 3.833 | 0.104 | G12 | | | | |
| 21 | Second lens element | 0.337 | 0.352 | T2 | Plastic | 1.573 | 37.666 | 0.982 |
| 22 | | 0.541 | 0.267 | G2F | | | | |
| 3 | Filter | Infinity | 0.210 | | | 1.512 | 62.574 | |
| | | Infinity | 0.051 | | | | | |
| 4 | Image Plane | Infinity | | | | | | |

FIG. 26

| No. | K | $a_4$ | $a_6$ | $a_8$ | $a_{10}$ |
|---|---|---|---|---|---|
| 11 | -1.427227E+01 | -8.644161E-01 | 9.059077E+01 | -6.291986E+03 | 2.358981E+05 |
| 12 | 3.861510E+01 | -7.292842E+00 | 4.700499E+01 | -4.167645E+01 | -3.555520E+03 |
| 21 | -2.268456E+00 | -3.205571E+00 | 5.885133E+01 | -6.860442E+02 | 4.609240E+03 |
| 22 | -1.348286E+00 | 2.205166E+00 | 1.626307E-01 | -2.956416E+02 | 2.866041E+03 |
| No. | $a_{12}$ | $a_{14}$ | $a_{16}$ | $a_{18}$ | $a_{20}$ |
| 11 | -5.196037E+06 | 6.888396E+07 | -5.397131E+08 | 2.298051E+09 | -4.090479E+09 |
| 12 | 4.199788E+04 | -2.418610E+05 | 7.821438E+05 | -1.356820E+06 | 9.841057E+05 |
| 21 | -1.989682E+04 | 5.434342E+04 | -8.447768E+04 | 5.358055E+04 | 7.372035E+03 |
| 22 | -1.389025E+04 | 3.980530E+04 | -6.813871E+04 | 6.530708E+04 | -2.835170E+04 |

FIG. 27

| No. | | Radius of Curvature (mm) | Ape. Stop Distance Thickness Air Gap (mm) | | Material | nd Refractive Index | Vd Abbe No. | Focal Length (mm) |
|---|---|---|---|---|---|---|---|---|
| | | | Sixth Embodiment | | | | | |
| | | EFL=0.591 mm; HFOV=53.996degrees; TTL=1.428mm; Fno=1.500 ; ImgH=0.690mm | | | | | | |
| | Object | Infinity | Infinity | | | | | |
| 2 | Ape. Stop | Infinity | 0.013 | | | | | |
| 11 | First lens element | -33.143 | 0.669 | T1 | Plastic | 1.545 | 55.987 | 3.533 |
| 12 | | -1.803 | 0.024 | G12 | | | | |
| 21 | Second lens element | 0.276 | 0.200 | T2 | Plastic | 1.573 | 37.666 | 0.727 |
| 22 | | 0.637 | 0.237 | G2F | | | | |
| 3 | Filter | Infinity | 0.210 | | | 1.512 | 62.574 | |
| | | Infinity | 0.088 | | | | | |
| 4 | Image Plane | Infinity | | | | | | |

FIG. 28

| No. | K | $a_4$ | $a_6$ | $a_8$ | $a_{10}$ |
|---|---|---|---|---|---|
| 11 | -4.977961E-03 | 1.346720E+01 | 1.258138E+02 | -6.503180E+04 | 3.362263E+06 |
| 12 | 1.397362E+01 | -1.619307E+01 | 3.277132E+02 | -5.828331E+03 | 6.204229E+04 |
| 21 | -1.299361E+01 | 1.479899E+01 | -2.218502E+02 | 1.897878E+03 | -9.308194E+03 |
| 22 | -5.196561E-01 | 7.438397E+00 | -7.947327E+01 | 3.627835E+02 | -8.265634E+02 |
| No. | $a_{12}$ | $a_{14}$ | $a_{16}$ | $a_{18}$ | $a_{20}$ |
| 11 | -8.349313E+07 | 1.163883E+09 | -9.523697E+09 | 3.691452E+10 | 6.295409E+10 |
| 12 | -2.582452E+05 | -1.188952E+06 | 1.743080E+07 | -6.901016E+07 | 9.572019E+07 |
| 21 | 1.909197E+04 | 3.337908E+04 | -2.766125E+05 | 5.797990E+05 | -4.303983E+05 |
| 22 | -9.659588E+00 | 5.205490E+03 | -1.373376E+04 | 1.605990E+04 | -7.564707E+03 |

FIG. 29

| Embodiment | 1 | 2 | 3 | 4 | 5 | 6 |
|---|---|---|---|---|---|---|
| EFL | 0.776 | 0.805 | 0.812 | 0.821 | 0.950 | 0.591 |
| Fno | 1.500 | 1.732 | 1.500 | 1.500 | 1.500 | 1.500 |
| HFOV | 46.637 | 41.477 | 40.069 | 42.740 | 32.499 | 53.996 |
| ImgH | 0.690 | 0.690 | 0.690 | 0.690 | 0.650 | 0.690 |
| T1 | 0.383 | 0.431 | 0.459 | 0.417 | 0.868 | 0.669 |
| G12 | 0.070 | 0.123 | 0.319 | 0.255 | 0.104 | 0.024 |
| T2 | 0.142 | 0.237 | 0.133 | 0.293 | 0.352 | 0.200 |
| G23 | 0.237 | 0.237 | 0.237 | 0.237 | 0.267 | 0.237 |
| TF | 0.210 | 0.210 | 0.210 | 0.210 | 0.210 | 0.210 |
| GFP | 0.363 | 0.189 | 0.099 | 0.128 | 0.051 | 0.088 |
| V1 | 19.480 | 19.480 | 19.480 | 37.666 | 19.480 | 55.987 |
| V2 | 22.409 | 22.409 | 22.409 | 55.987 | 37.666 | 37.666 |
| ER11 | 0.284 | 0.284 | 0.292 | 0.295 | 0.321 | 0.219 |
| ER12 | 0.435 | 0.426 | 0.442 | 0.440 | 0.534 | 0.458 |
| ER21 | 0.567 | 0.430 | 0.533 | 0.584 | 0.519 | 0.579 |
| ER22 | 0.597 | 0.542 | 0.596 | 0.665 | 0.524 | 0.662 |

FIG. 30

| Embodiment | 1 | 2 | 3 | 4 | 5 | 6 |
|---|---|---|---|---|---|---|
| EPD | 0.517 | 0.465 | 0.541 | 0.548 | 0.633 | 0.394 |
| BFL | 0.809 | 0.636 | 0.546 | 0.575 | 0.527 | 0.534 |
| ALT | 0.525 | 0.667 | 0.592 | 0.710 | 1.220 | 0.870 |
| TL | 0.595 | 0.790 | 0.911 | 0.965 | 1.324 | 0.894 |
| TTL | 1.405 | 1.426 | 1.457 | 1.540 | 1.851 | 1.428 |
| T1/T2 | 2.697 | 1.821 | 3.449 | 1.426 | 2.462 | 3.339 |
| Fno*(G12+T2+BFL)/T1 | 4.003 | 4.001 | 3.260 | 4.034 | 1.700 | 1.700 |
| HFOV/Fno | 31.092 | 23.947 | 26.713 | 28.493 | 21.666 | 35.997 |
| V2/V1 | 1.150 | 1.150 | 1.150 | 1.486 | 1.934 | 0.673 |
| Fno*(EFL+BFL+ImgH)/T1 | 8.914 | 8.567 | 6.558 | 7.498 | 3.677 | 4.068 |
| HFOV*T1/ImgH | 25.887 | 25.897 | 28.305 | 25.851 | 43.378 | 52.389 |
| HFOV*T1/(ImgH*Fno) | 17.258 | 14.952 | 18.870 | 17.234 | 28.919 | 34.926 |
| TTL/EPD | 2.716 | 3.068 | 2.691 | 2.812 | 2.923 | 3.623 |
| TL/EPD | 1.150 | 1.700 | 1.684 | 1.763 | 2.091 | 2.267 |
| ALT/EPD | 1.015 | 1.436 | 1.094 | 1.296 | 1.927 | 2.207 |
| TL/ER12 | 1.368 | 1.854 | 2.063 | 2.192 | 2.481 | 1.951 |
| TL/ER21 | 1.049 | 1.838 | 1.710 | 1.652 | 2.549 | 1.543 |
| TL/ER22 | 0.997 | 1.459 | 1.530 | 1.452 | 2.525 | 1.351 |
| (T2+EFL)/BFL | 1.134 | 1.638 | 1.732 | 1.939 | 2.470 | 1.482 |
| Fno*(D12t22+T2)/BFL | 0.657 | 1.623 | 1.610 | 2.194 | 2.302 | 1.192 |
| (EFL+D12t22)/BFL | 1.221 | 1.831 | 2.318 | 2.383 | 2.667 | 1.526 |
| (ER22+ER12)/(ER21+ER11) | 1.213 | 1.355 | 1.258 | 1.257 | 1.259 | 1.402 |
| EFL/ER11 | 2.727 | 2.833 | 2.782 | 2.783 | 2.962 | 2.694 |
| HFOV*T1/T2 | 125.789 | 75.518 | 138.283 | 60.828 | 80.14 | 180.617 |
| HFOV*T1/D12t22 | 84.255 | 49.657 | 40.690 | 32.523 | 61.862 | 161.265 |
| HFOV*ER11/D12t22 | 62.476 | 37.271 | 25.885 | 23.008 | 22.878 | 77.378 |
| Fno*(EFL+ImgH)/T1 | 5.742 | 6.010 | 4.776 | 5.432 | 2.766 | 2.871 |

FIG. 31

OPTICAL IMAGING LENS

BACKGROUND OF THE INVENTION

1. Field of the Invention

The present invention generally relates to an optical imaging lens. Specifically speaking, the present invention is directed to an optical imaging lens for using in a portable electronic device such as a mobile phone, a camera, a tablet personal computer, a personal digital assistant (PDA), a head-mounted device (AR, VR), or a vehicle camera device for taking pictures or for recording videos.

2. Description of the Prior Art

The specifications of portable electronic devices are changing with each passing day, and the key component: the optical imaging lens, is developing more diversified, its applications are not limited to shooting images and recording videos, but also environmental monitoring, driving record photography, AR, VR, etc. With the progress of image sensing technology, consumers' requirements for imaging quality are also higher. Therefore, the design of optical imaging lens requires not only good imaging quality, but also small lens space. For invisible infrared detection and environmental temperature stability in response to driving and poor light environment, it is also a subject to be considered.

At present, the optical imaging lens for environmental monitoring mainly shoots infrared light with 880 nanometers (nm) visible light, but it must provide a visible light source with 880 nm. If 940 nm invisible infrared light is ingested, based on the characteristics of 940 nm light on water, the interference of rainy days and sunlight can be minimized. In addition, with the development of AR and VR, the demand for optical imaging lens for environmental monitoring in different directions is obviously increasing, so how to design an optical imaging lens that can image 940 nm infrared light with small volume and high forming yield, thus reducing the cost, is the problem to be solved by the present invention.

SUMMARY OF THE INVENTION

The present invention provides an optical imaging lens. The optical imaging lens of the present invention from an object side to an image side in order along an optical axis has a first lens element and a second lens element. The first lens element and the second lens element respectively has an object-side surface which faces toward the object side to allow imaging rays to pass through as well as an image-side surface which faces toward the image side to allow the imaging rays to pass through.

In an embodiment of the present invention, a periphery region of the image-side surface of the first lens element is convex, an optical axis region of the image-side surface of the second lens element is concave. Lens elements included by the optical imaging lens are only the two lens elements described above, and the optical imaging lens satisfies the relationship: HFOV*T1/(ImgH*Fno)≥12.000 degrees, and T1/T2≥1.300.

In another embodiment of the present invention, a periphery region of the object-side surface of the second lens element is concave, an optical axis region of the image-side surface of the second lens element is concave. Lens elements included by the optical imaging lens are only the two lens elements described above, and the optical imaging lens satisfies the relationship: HFOV*T1/(ImgH*Fno)≥12.000 degrees, T1/T2≥1.300.

In another embodiment of the present invention, a periphery region of the image-side surface of the first lens element is convex, an optical axis region of the image-side surface of the second lens element is concave. Lens elements included by the optical imaging lens are only the two lens elements described above, and the optical imaging lens satisfies the relationship: Fno*(EFL+BFL+ImgH)/T1≤8.900, T1/T2≥1.300.

In the optical imaging lens of the present invention, the embodiments may also selectively satisfy the following optical relationships:

25.000 degrees≤HFOV*$T1$/Img$H$;

12.000 degrees≤HFOV*$T1$/Img$H$*Fno);

$TTL$/EPD≤3.650;

($T2$+EFL)/$BFL$≤2.500;

Fno*($D12t22$+$T2$)/$BFL$≤2.400;

(EFL+$D12t22$)/$BFL$≤2.700;

2.600≤EFL/ER11;

70.000 degrees≤HFOV*$T1$/$T2$;

22.500 degrees≤HFOV*$T1$/$D12t22$;

14.000 degrees≤HFOV*ER11/$D12t22$;

Fno*(EFL+Img$H$)/$T1$≤6.100;

$TL$/EPD≤2.300;

$ALT$/EPD≤2.300;

$TL$/ER12≤2.500;

$TL$/ER21≤2.600;

$TL$/ER22≤2.600;

1.100≤(ER22+ER12)/(ER21+ER11)

In the present invention, T1 is a thickness of the first lens element along the optical axis, T2 is a thickness of the second lens element along the optical axis, ALT is a sum of thicknesses of the two lens elements from the first lens element to the second lens element along the optical axis; TL is a distance from the object-side surface of the first lens element to the image-side surface of the second lens element along the optical axis; TTL is the distance from the object-side surface of the first lens element to an image plane along the optical axis; BFL is a distance from the image-side surface of the second lens element to the image plane along the optical axis; EFL is an effective focal length of the optical imaging lens; ImgH is defined as an maximum image height of the optical imaging lens; HFOV is defined as a maximum half field of view of the optical imaging lens; Fno is defined as a f-number of the optical imaging lens; ALT is a sum of thicknesses of the two lens elements from the first lens element to the second lens element along the optical axis; D12t22 is a distance from the image-side surface of the first lens element to the image-side surface of the second lens element along the optical axis; ER11 is defined as an effective radius of the object-side surface of the first lens element, ER12 is defined as an effective radius of the image-side surface of the first lens element, ER21 is defined as an effective radius of the object-side surface of the second lens element, ER22 is defined as an effective radius of the image-side surface of the second lens element.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 illustrates a first embodiment of the optical imaging lens of the present invention.

FIG. 7A illustrates the longitudinal spherical aberration on the image plane of the first embodiment.

FIG. 7B illustrates the field curvature aberration on the sagittal direction of the first embodiment.

FIG. 7C illustrates the field curvature aberration on the tangential direction of the first embodiment.

FIG. 7D illustrates the distortion of the first embodiment.

FIG. 14 illustrates a fifth embodiment of the optical imaging lens of the present invention.

FIG. 15A illustrates the longitudinal spherical aberration on the image plane of the fifth embodiment.

FIG. 15B illustrates the field curvature aberration on the sagittal direction of the fifth embodiment.

FIG. 15C illustrates the field curvature aberration on the tangential direction of the fifth embodiment.

FIG. 15D illustrates the distortion of the fifth embodiment.

FIG. 18 shows the optical data of the first embodiment of the optical imaging lens.

FIG. 19 shows the aspheric surface data of the first embodiment.

FIG. 20 shows the optical data of the second embodiment of the optical imaging lens.

FIG. 21 shows the aspheric surface data of the second embodiment.

FIG. 22 shows the optical data of the third embodiment of the optical imaging lens.

FIG. 23 shows the aspheric surface data of the third embodiment.

FIG. 24 shows the optical data of the fourth embodiment of the optical imaging lens.

FIG. 25 shows the aspheric surface data of the fourth embodiment.

FIG. 26 shows the optical data of the fifth embodiment of the optical imaging lens.

FIG. 27 shows the aspheric surface data of the fifth embodiment.

FIG. 28 shows the optical data of the sixth embodiment of the optical imaging lens.

FIG. 29 shows the aspheric surface data of the sixth embodiment.

FIG. 30 shows some important ratios in the embodiments.

FIG. 31 shows some important ratios in the embodiments.

DETAILED DESCRIPTION

The terms "optical axis region", "periphery region", "concave", and "convex" used in this specification and claims should be interpreted based on the definition listed in the specification by the principle of lexicographer.

Figure 1:
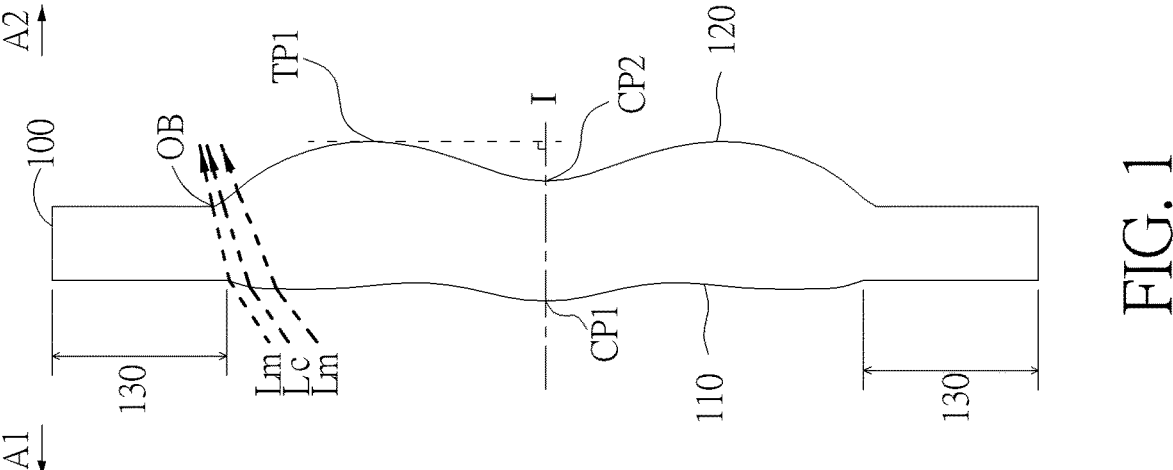

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figures 3, 4, 5:
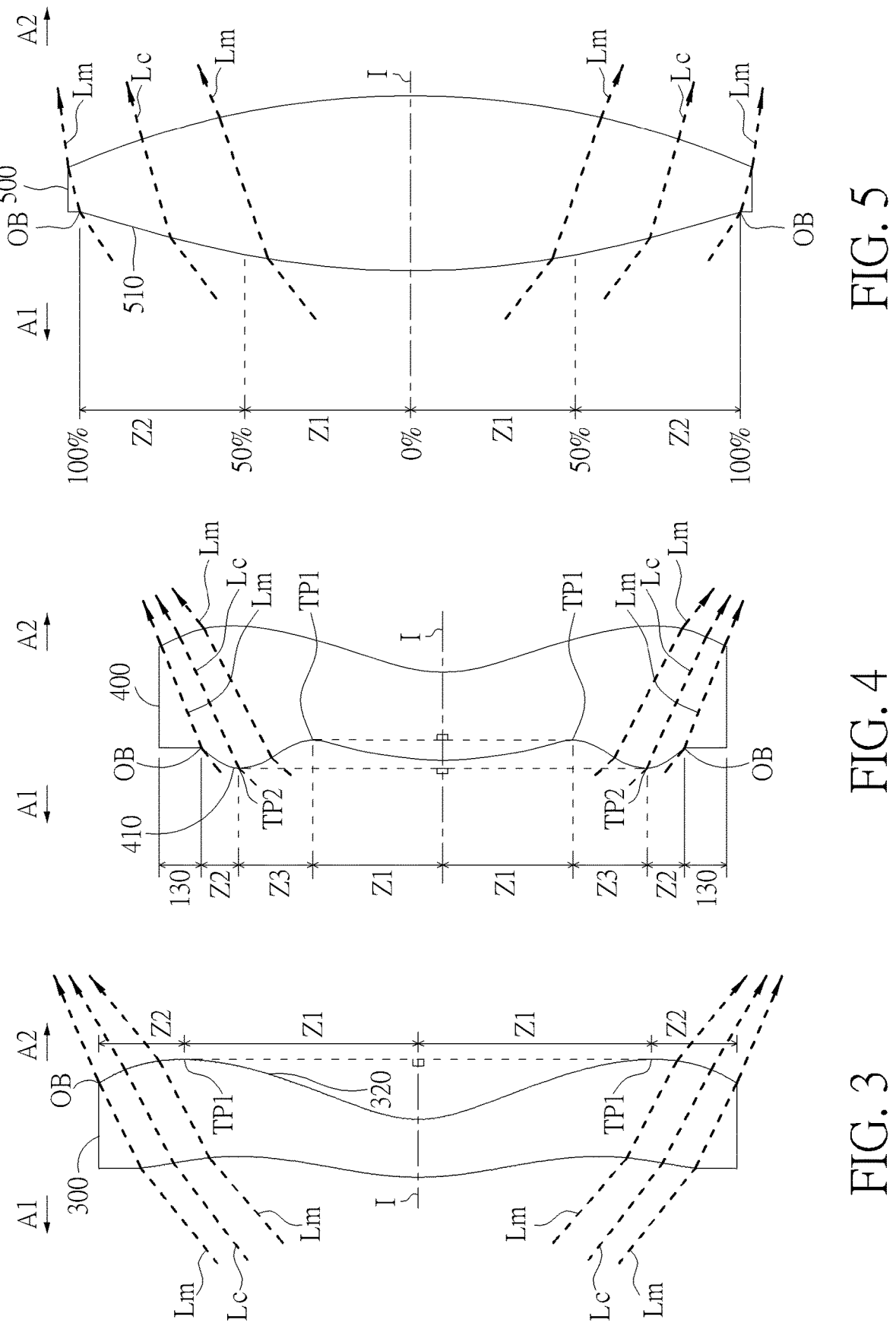

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
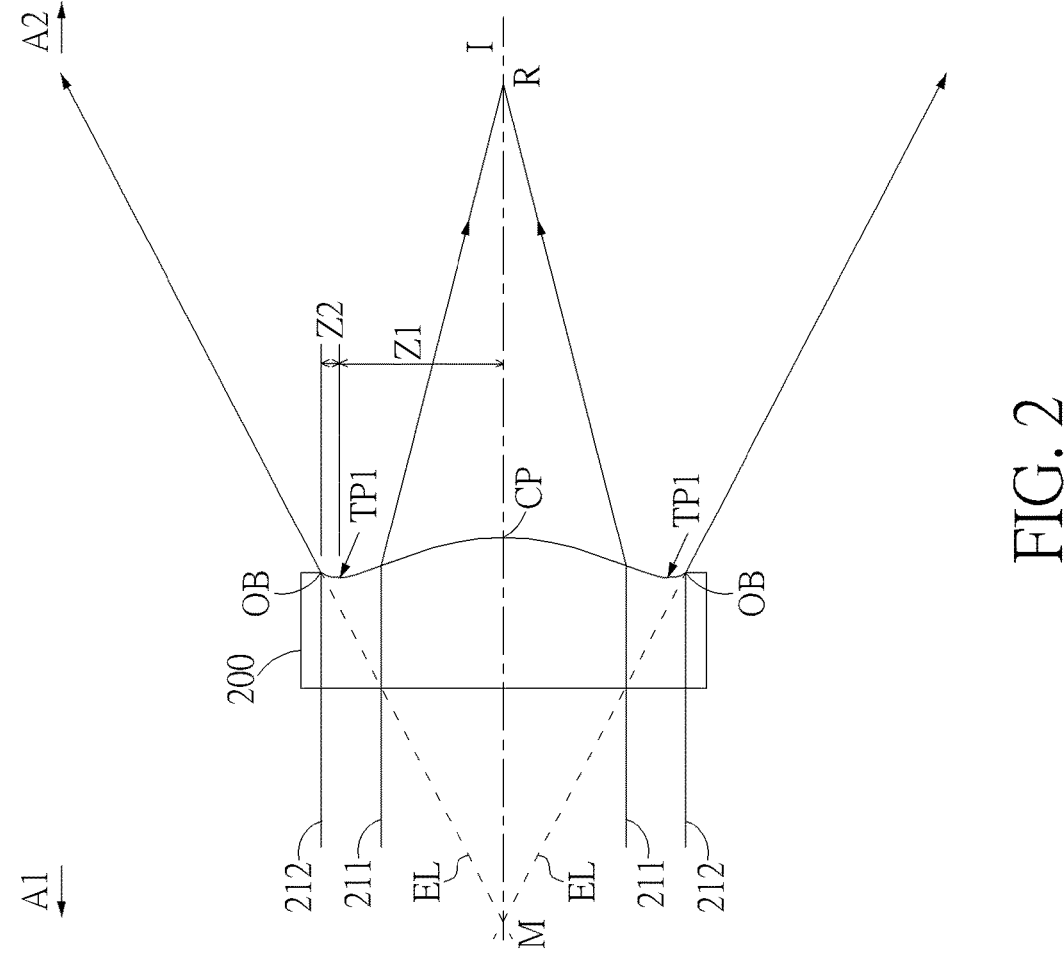
FIGS. 1-5 illustrate the methods for determining the surface shapes and for determining optical axis region or periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

As shown in FIG. 6, the optical imaging lens 1 of two lens elements of the present invention, sequentially located from an object side A1 (where an object is located) to an image side A2 along an optical axis I, has an aperture stop (ape. stop) 2, a first lens element 10, a second lens element 20, a filter 3 and an image plane 4. Generally speaking, the first lens element 10 and the second lens element 20 may be made of a transparent plastic material but the present invention is not limited to this, and each has an appropriate refracting power. In the present invention, lens elements having refracting power included by the optical imaging lens 1 are only the two lens elements (the first lens element 10 and the second lens element 20) described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 2 disposed in an appropriate position. In FIG. 6, the aperture stop 2 is disposed on the side of the first lens element 10 facing the object side A1. When ray emitted or reflected by an object (not shown) which is located at the object side A1 enters the optical imaging lens 1 of the present invention, it forms a clear and sharp image on the image plane 4 at the image side A2 after passing through the aperture stop 2, the first lens element 10, the second lens element 20 and the filter 3. In one embodiment of the present invention, the filter 3 is placed between the second lens element 20 and the image plane 4. The optional filter 3 may be a filter of various suitable functions, for example, the filter 3 may be an far infrared cut-off filter (Far IR cut filter), which is used to prevent far infrared rays in the imaging ray from being transmitted to the image plane 4 to affect the imaging quality.

Each lens element in the optical imaging lens 1 of the present invention has an object-side surface facing toward the object side A1 to allow imaging rays to pass through as well as an image-side surface facing toward the image side A2 to allow the imaging rays to pass through. For example, the first lens element 10 has an object-side surface 11 and an image-side surface 12, the second lens element 20 has an object-side surface 21 and an image-side surface 22. In addition, each object-side surface and image-side surface in the optical imaging lens 1 of the present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2. Therefore, a sum of thicknesses of the two lens elements of the first lens element 10 and the second lens element 20 along the optical axis I is ALT=T1+T2.

In addition, between two adjacent lens elements in the optical imaging lens 1 of the present invention there may be an air gap along the optical axis I. For example, there is an air gap G12 between the first lens element 10 and the second lens element 20.

In addition, a distance from the object-side surface 11 of the first lens element 10 to the image plane 4 along the optical axis I is TTL, namely a system length of the optical imaging lens 1; an effective focal length of the optical imaging lens 1 is EFL; a distance from the object-side surface 11 of the first lens element 10 to the image-side surface 22 of the second lens element 20 along the optical axis I is TL; HFOV stands for the maximum half field of view which is half of the field of view of the entire optical imaging lens 1; ImgH is an maximum image height of the optical imaging lens 1, and Fno is a f-number of the optical imaging lens 1.

When the filter 3 is placed between the second lens element 20 and the image plane 4, an air gap between the second lens element 20 and the filter 3 along the optical axis I is G2F; a thickness of the filter 3 along the optical axis I is TF; an air gap between the filter 3 and the image plane 4 along the optical axis I is GFP; and a distance from the image-side surface 22 of the second lens element 20 to the image plane 4 along the optical axis I is BFL. Therefore, BFL=G2F+TF+GFP.

Furthermore, a focal length of the first lens element 10 is f1; a focal length of the second lens element 20 is f2; a refractive index of the first lens element 10 is n1; a refractive index of the second lens element 20 is n2; an Abbe number of the first lens element 10 is V1; an Abbe number of the second lens element 20 is V2; EPD is the entrance pupil diameter of the optical imaging lens 1, which is equal to the effective focal length EFL of the optical imaging lens 1 divided by the f-number Fno; D12t22 is a distance from the image-side surface 12 of the first lens element 10 to the image-side surface 22 of the second lens element 20 along the optical axis I; ER11 is defined as an effective radius of the object-side surface 11 of the first lens element 10, that is, the optical boundary of the object-side surface 11 of the first lens element 10; ER12 is defined as the effective radius of the image-side surface 12 of the first lens element 10, that is, the optical boundary of the image-side surface 12 of the first lens element 10; ER21 is defined as the effective radius of the object-side surface 21 of the second lens element 20, that is, the optical boundary of the object-side surface 21 of the second lens element 20; ER22 is defined as the effective radius of the image-side surface 22 of the second lens element 20, that is, the optical boundary of the image side 22 of the second lens element 20.

In addition, the above definition and the lens material parameters subsequently revealed in the optical parameter table are in the format of refractive index nd and Abbe number Vd of the International Glass Code, so that those skilled in the art can know the specific material implementation, where nd is the refractive index of the substance at 587.56 nm of the D Helium Yellow Line, and Vd is calculated by the refractive index of the substance at d, F and C wavelengths of the Fraunhofer spectrum.

The focal length value disclosed in the optical parameter table of the embodiment is calculated based on the refractive index of the wavelength band implemented by the optical system, while the wavelength band implemented by the embodiment of the invention is 940 nm, so the focal length value of the invention is calculated based on the refractive index of the material at 940 nm.

First Embodiment

Please refer to FIG. 6 which illustrates the first embodiment of the optical imaging lens 1 of the present invention. Please refer to FIG. 7A for the longitudinal spherical aberration on the image plane 4 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of each aberration and the distortion in each embodiment stands for "maximum image height" (ImgH), and the maximum image height of the first embodiment is 0.690 mm.

Only the first lens element 10 and the second lens element 20 of the optical imaging lens 1 of the first embodiment have refracting power. The optical imaging lens 1 also has an aperture stop 2, a filter 3, and an image plane 4. The aperture stop 2 is disposed on the side of the first lens element 10 facing the object side A1.

The first lens element 10 has negative refracting power. An optical axis region 13 of the object-side surface 11 of the first lens element 10 is concave, and a periphery region 14 of the object-side surface 11 of the first lens element 10 is concave. An optical axis region 16 of the image-side surface 12 of the first lens element 10 is concave, and a periphery region 17 of the image-side surface 12 of the first lens element 10 is convex. Besides, both the object-side surface 11 and the image-side surface 12 of the first lens element 10 are aspheric surfaces, but it is not limited thereto.

The second lens element 20 has positive refracting power. An optical axis region 23 of the object-side surface 21 of the second lens element 20 is convex, and a periphery region 24 of the object-side surface 21 of the second lens element 20 is concave. An optical axis region 26 of the image-side surface 22 of the second lens element 20 is concave, and a periphery region 27 of the image-side surface 22 of the second lens element 20 is convex. Besides, both the object-side surface 21 and the image-side surface 22 of the second lens element 20 are aspheric surfaces, but it is not limited thereto.

The first lens element 10 and the second lens element 20 of the optical imaging lens 1 of the present invention, there are 4 surfaces, such as the object-side surfaces 11/21 and the image-side surfaces 12/22. If a surface is aspheric, these aspheric coefficients are defined according to the following formula:

$$Z(Y) = \frac{Y^2}{R}\left(1 + \sqrt{1 - (1+K)\frac{Y^2}{R^2}}\right) + \sum_{i=1}^{n} a_{2i} \times Y^{2i}$$

In which:

Y represents a perpendicular distance from a point on the aspheric surface to the optical axis;

Z represents the depth of an aspheric surface (the perpendicular distance between the point of the aspheric surface at a distance Y from the optical axis and the tangent plane of the vertex on the optical axis of the aspheric surface);

R represents the radius of curvature of the lens element surface;

K is a conic constant; and $a_{2i}$ is the aspheric coefficient of the $2i^{th}$ order, in which the $a_2$ coefficient of each embodiment is 0, therefore, the $a_2$ coefficient is not indicated in the following aspheric surface data tables.

The optical data of the first embodiment of the optical imaging lens 1 are shown in FIG. 18 while the aspheric surface data are shown in FIG. 19. In the present embodiments of the optical imaging lens, the f-number of the entire optical imaging lens is Fno, the effective focal length is EFL, HFOV stands for the maximum half field of view which is half of the field of view of the entire optical imaging lens, and the unit for the radius of curvature, the thickness and the focal length is in millimeters (mm). In this embodiment, EFL=0.776 mm; HFOV=46.637 degrees; TTL=1.404 mm; Fno=1.500; ImgH=0.690 mm.

Second Embodiment

Figure 8:
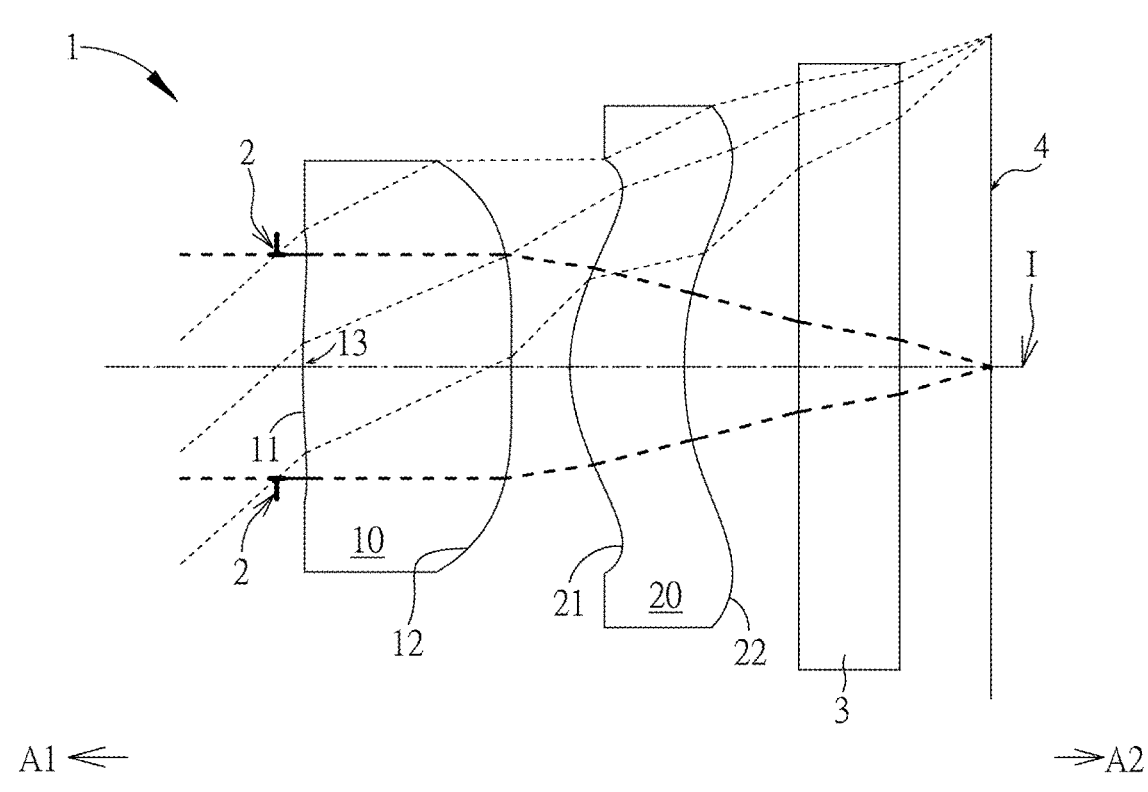
FIG. 8 illustrates a second embodiment of the optical imaging lens of the present invention.
Figures 9A, 9B, 9C, 9D:
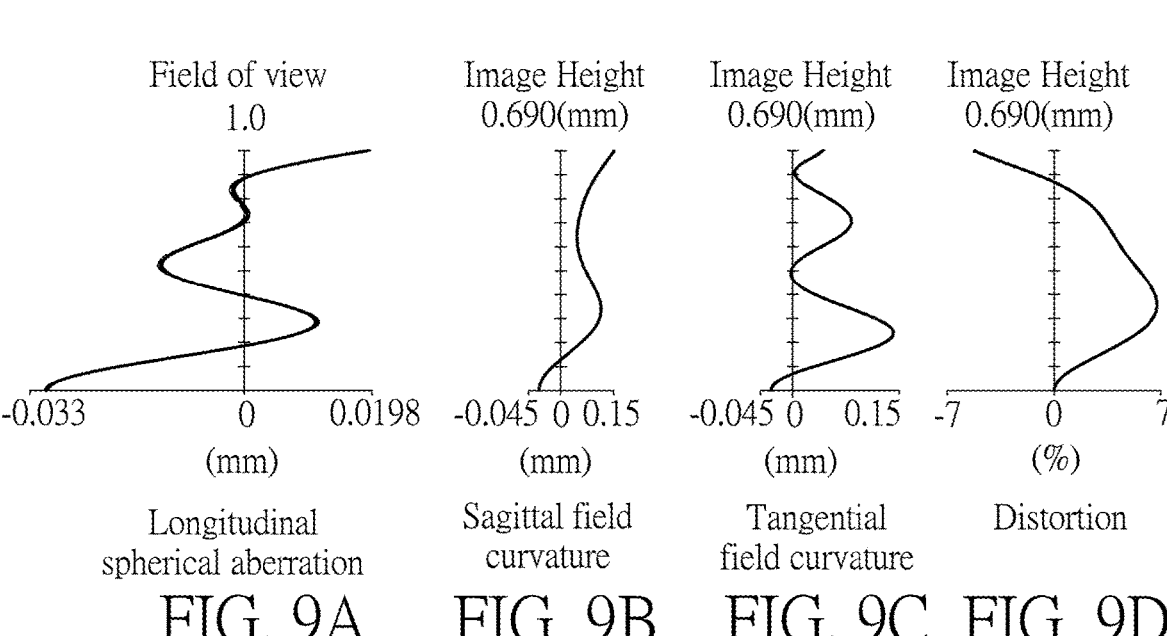
FIG. 9A illustrates the longitudinal spherical aberration on the image plane of the second embodiment.
FIG. 9B illustrates the field curvature aberration on the sagittal direction of the second embodiment.
FIG. 9C illustrates the field curvature aberration on the tangential direction of the second embodiment.
FIG. 9D illustrates the distortion of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the portion in a vicinity of the optical axis and the portion in a vicinity of its periphery will be omitted in the following embodiments. Please refer to FIG. 9A for the longitudinal spherical aberration on the image plane 4 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the lens element refracting power, the radius of curvature, the lens element thickness, the aspheric surface or the back focal length in this embodiment are different from the optical data in the first embodiment. Besides, in this embodiment, the first lens element 10 has positive refracting power, the optical axis region 13 of the object-side surface 11 of the first lens element 10 is convex.

The optical data of the second embodiment of the optical imaging lens are shown in FIG. 20 while the aspheric surface data are shown in FIG. 21. In this embodiment, EFL=0.805 mm; HFOV=41.477 degrees; TTL=1.426 mm; Fno=1.732; ImgH=0.690 mm. In particular: 1. The longitudinal spherical aberration in this embodiment is smaller than the longitudinal spherical aberration in the first embodiment; 2. The field curvature aberration on the sagittal direction in this embodiment is smaller than the field curvature aberration on the sagittal direction in the first embodiment; 3. The field curvature aberration on the tangential direction in this embodiment is smaller than the field curvature aberration on the tangential direction in the first embodiment; 4. The distortion aberration in this embodiment is smaller than the distortion aberration in the first embodiment.

Third Embodiment

Figure 10:
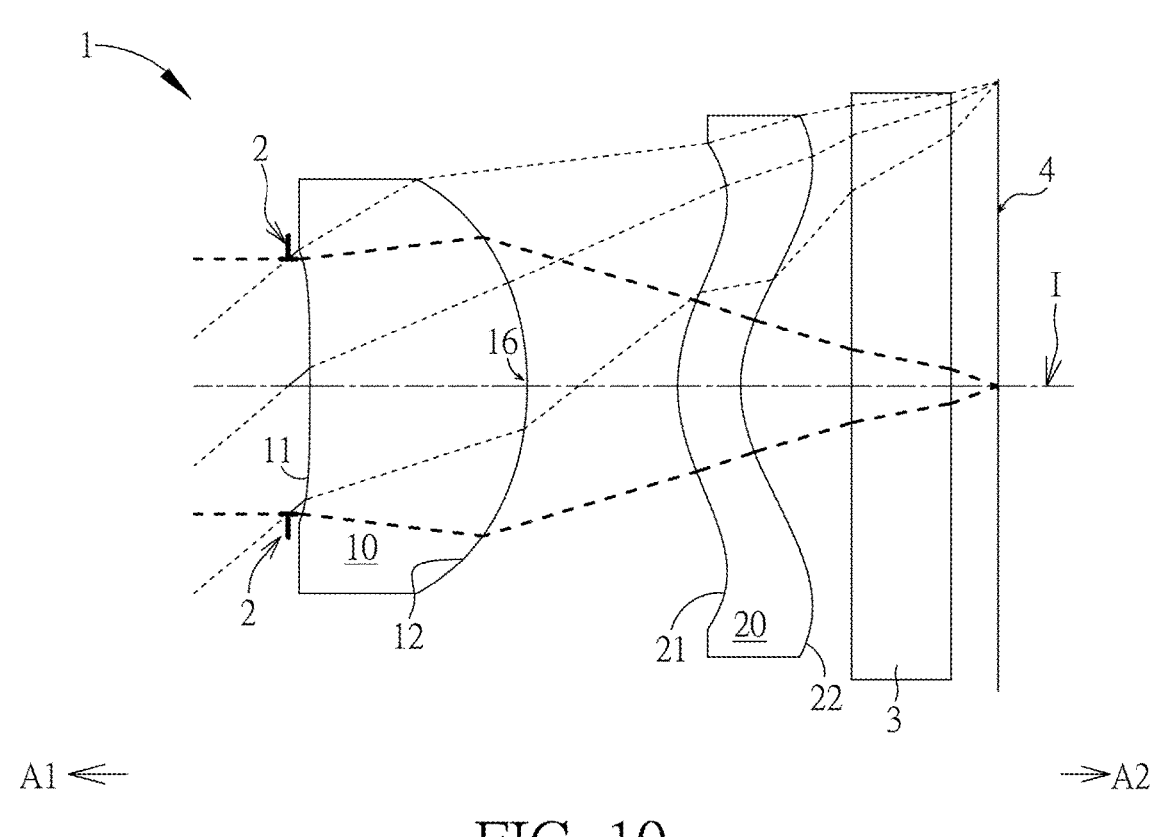
FIG. 10 illustrates a third embodiment of the optical imaging lens of the present invention.
Figures 11A, 11B, 11C, 11D:
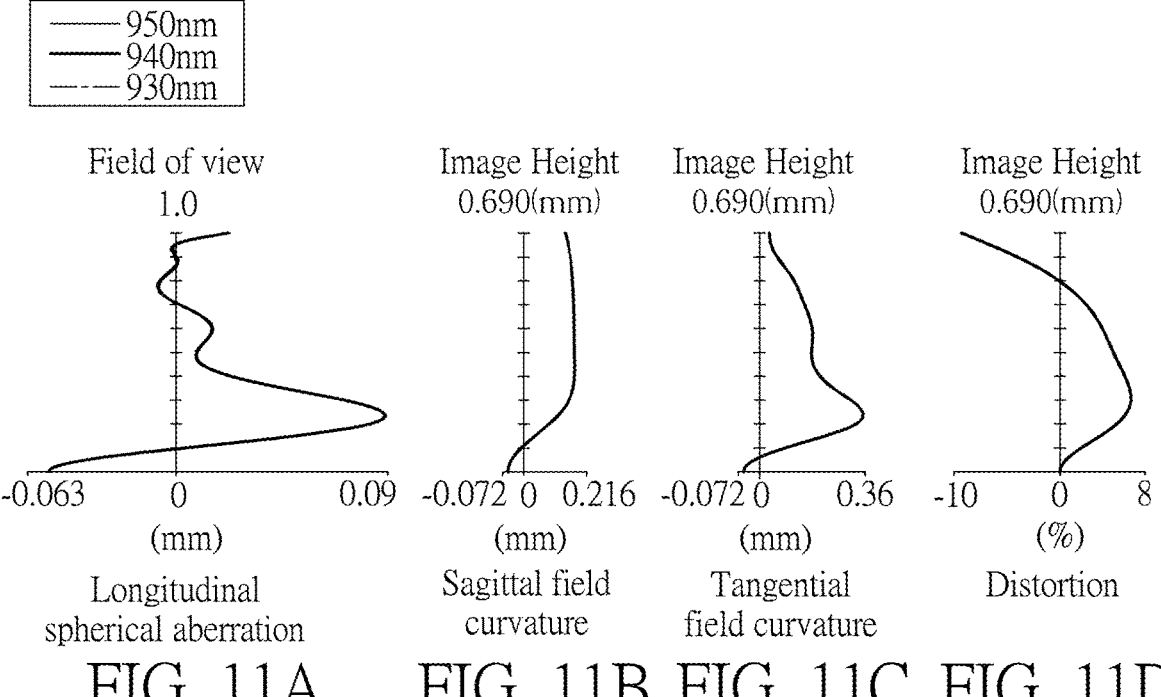
FIG. 11A illustrates the longitudinal spherical aberration on the image plane of the third embodiment.
FIG. 11B illustrates the field curvature aberration on the sagittal direction of the third embodiment.
FIG. 11C illustrates the field curvature aberration on the tangential direction of the third embodiment.
FIG. 11D illustrates the distortion of the third embodiment.

Please refer to FIG. 10 which illustrates the third embodiment of the optical imaging lens 1 of the present invention. Please refer to FIG. 11A for the longitudinal spherical aberration on the image plane 4 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the lens element refracting power, the radius of curvature, the lens element thickness, the aspheric surface or the back focal length in this embodiment are different from the optical data in the first embodiment. In addition, in this embodiment, the first lens element 10 has positive refracting power, the optical axis region 16 of the image-side surface 12 of the first lens element 10 is convex, the second lens element 20 has negative refracting power.

The optical data of the third embodiment of the optical imaging lens are shown in FIG. 22 while the aspheric surface data are shown in FIG. 23. In this embodiment, EFL=0.812 mm; HFOV=40.069 degrees; TTL=1.457 mm; Fno=1.500; ImgH=0.690 mm. In particular: 1. The distortion aberration in this embodiment is smaller than the distortion aberration in the first embodiment.

Fourth Embodiment

Figure 12:
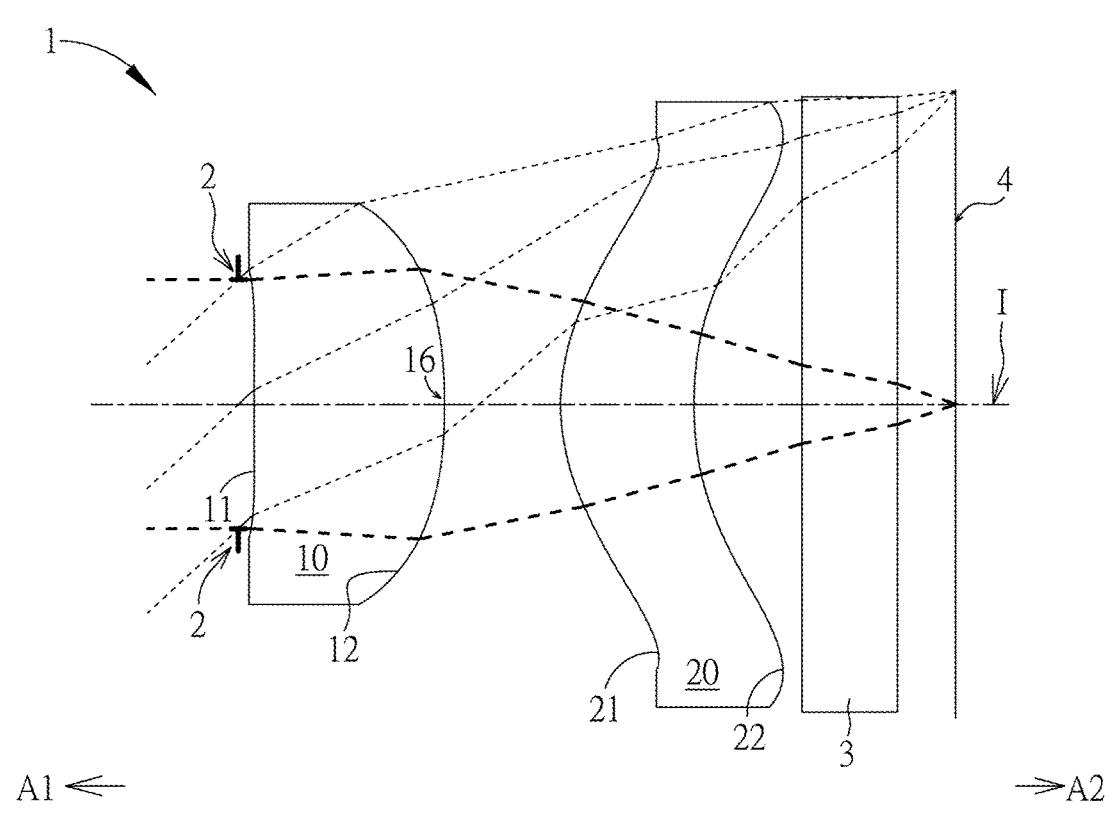
FIG. 12 illustrates a fourth embodiment of the optical imaging lens of the present invention.
Figures 13A, 13B, 13C, 13D:
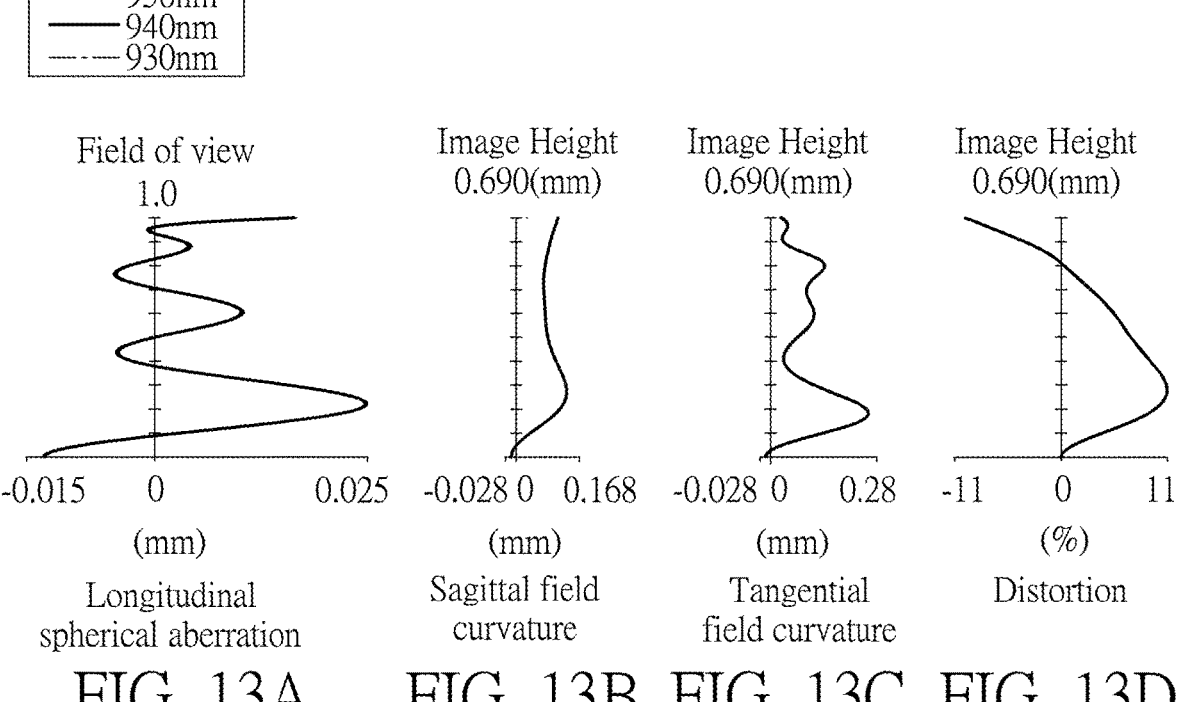
FIG. 13A illustrates the longitudinal spherical aberration on the image plane of the fourth embodiment.
FIG. 13B illustrates the field curvature aberration on the sagittal direction of the fourth embodiment.
FIG. 13C illustrates the field curvature aberration on the tangential direction of the fourth embodiment.
FIG. 13D illustrates the distortion of the fourth embodiment.

Please refer to FIG. 12 which illustrates the fourth embodiment of the optical imaging lens 1 of the present invention. Please refer to FIG. 13A for the longitudinal spherical aberration on the image plane 4 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the lens element refracting power, the radius of curvature, the lens element thickness, the aspheric surface or the back focal length in this embodiment are different from the optical data in the first embodiment. In addition, in this embodiment, the first lens element 10 has positive refracting power, the optical axis region 16 of the image-side surface 12 of the first lens element 10 is convex.

The optical data of the fourth embodiment of the optical imaging lens are shown in FIG. 24 while the aspheric surface data are shown in FIG. 25. In this embodiment, EFL=0.821 mm; HFOV=42.740 degrees; TTL=1.540 mm; Fno=1.500; ImgH=0.690 mm. In particular: 1. The longitudinal spherical aberration in this embodiment is smaller than the longitudinal spherical aberration in the first embodiment; 2. The distortion aberration in this embodiment is smaller than the distortion aberration in the first embodiment.

Fifth Embodiment

Please refer to FIG. 14 which illustrates the fifth embodiment of the optical imaging lens 1 of the present invention. Please refer to FIG. 15A for the longitudinal spherical aberration on the image plane 4 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the lens element refracting power, the radius of curvature, the lens element thickness, the aspheric surface or the back focal length in this embodiment are different from the optical data in the first embodiment. In addition, in this embodiment, the first lens element 10 has positive refracting power, the optical axis region 13 of the object-side surface 11 of the first lens element 10 is convex, the periphery region 14 of the object-side surface 11 of the first lens element 10 is convex, the periphery region 27 of the image-side surface 22 of the second lens element 20 is concave.

The optical data of the fifth embodiment of the optical imaging lens are shown in FIG. 26 while the aspheric surface data are shown in FIG. 27. In this embodiment, EFL=0.950 mm; HFOV=32.499 degrees; TTL=1.851 mm; Fno=1.500; ImgH=0.650 mm. In particular: 1. The longitudinal spherical aberration in this embodiment is smaller than the longitudinal spherical aberration in the first embodiment; 2. The field curvature aberration on the sagittal direction in this embodiment is smaller than the field curvature aberration on the sagittal direction in the first embodiment; 3. The field curvature aberration on the tangential direction in this embodiment is smaller than the field curvature aberration on the tangential direction in the first embodiment; 4. The distortion aberration in this embodiment is smaller than the distortion aberration in the first embodiment.

Sixth Embodiment

Figure 16:
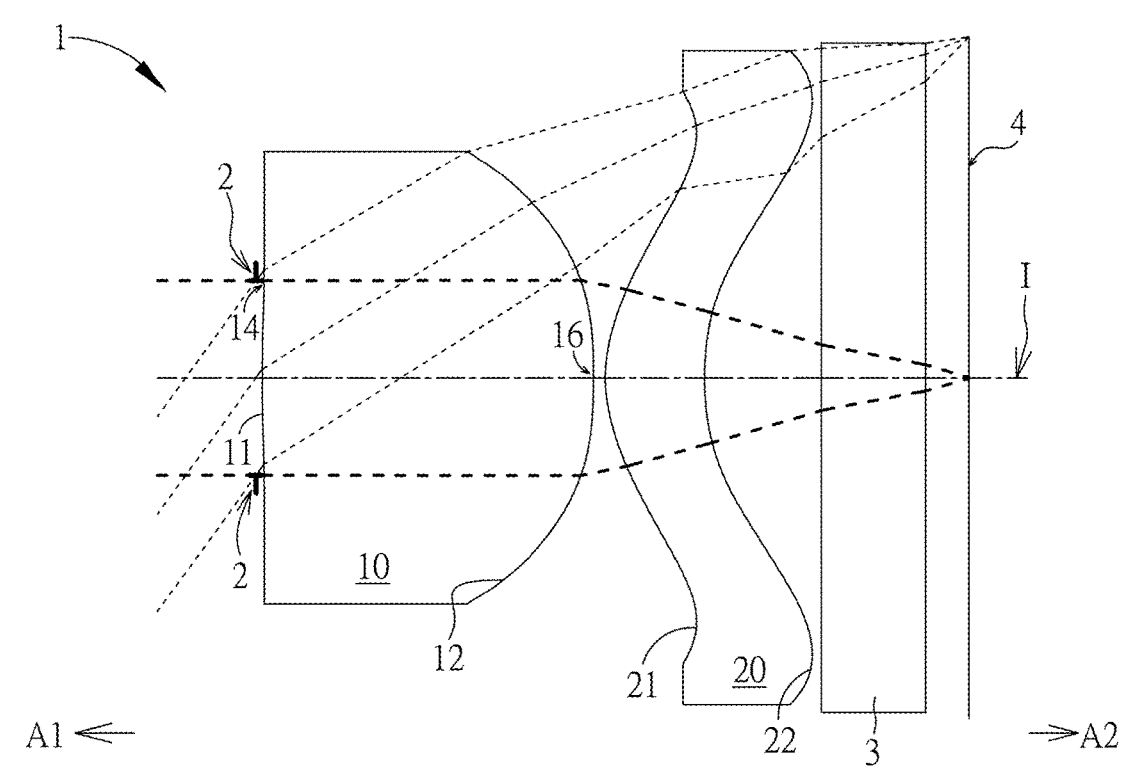
FIG. 16 illustrates a sixth embodiment of the optical imaging lens of the present invention.
Figures 17A, 17B, 17C, 17D:
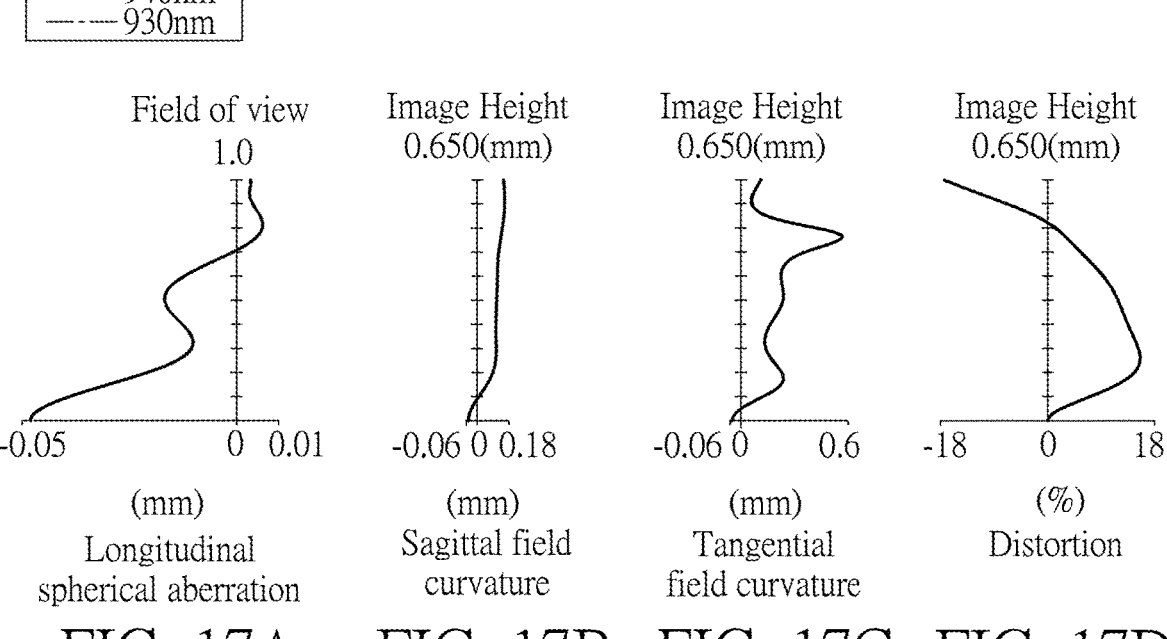
FIG. 17A illustrates the longitudinal spherical aberration on the image plane of the sixth embodiment.
FIG. 17B illustrates the field curvature aberration on the sagittal direction of the sixth embodiment.
FIG. 17C illustrates the field curvature aberration on the tangential direction of the sixth embodiment.
FIG. 17D illustrates the distortion of the sixth embodiment.

Please refer to FIG. 16 which illustrates the sixth embodiment of the optical imaging lens 1 of the present invention. Please refer to FIG. 17A for the longitudinal spherical aberration on the image plane 4 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the lens element refracting power, the radius of curvature, the lens element thickness, the aspheric surface or the back focal length in this embodiment are different from the optical data in the first embodiment. In addition, in this embodiment, the first lens element 10 has positive refracting power, the periphery region 14 of the object-side surface 11 of the first lens element 10 is convex, the optical axis region 16 of the image-side surface 12 of the first lens element 10 is convex.

The optical data of the sixth embodiment of the optical imaging lens are shown in FIG. 28 while the aspheric surface data are shown in FIG. 29. In this embodiment, EFL=0.591 mm; HFOV=53.996 degrees; TTL=1.428 mm; Fno=1.500; ImgH=0.690 mm. In particular: 1. The HFOV in this embodiment is larger than the HFOV in the first embodiment; 2. The longitudinal spherical aberration in this embodiment is smaller than the longitudinal spherical aberration in the first embodiment; 3. The distortion aberration in this embodiment is smaller than the distortion aberration in the first embodiment.

Some important ratios in each embodiment are shown in FIG. 30 and FIG. 31.

Each embodiment of the invention meets the concave/convex design of the following lens surface shape, has the characteristics of optimizing the imaging quality of an optical imaging lens system, and can achieve corresponding advantages:

1. The optical imaging lens satisfies the one of relationships of the optical axis region 26 of the image-side surface 22 of the second lens element 20 is concave, the periphery region 14 of the object-side surface 11 of the first lens element 10 is concave and the periphery region 24 of the object-side surface 21 of the second lens element 20 is concave, and T1/T2≥1.300. And if the optical imaging lens further satisfies the following combinations, it is beneficial to design an optical imaging lens which can image 940 nm infrared light, and has small volume, high forming yield and low cost, and the preferable range is 1.300≤T1/T2≤3.700:

(1) HFOV*T1/(ImgH*Fno)≥12.000 degrees, and the preferable range is 12.000 degrees≤HFOV*T1/(ImgH*Fno)≤41.000 degrees.

(2) Fno*(EFL+BFL+ImgH)/T1≤8.900, and the preferable range is 3.000≤Fno*(EFL+BFL+ImgH)/T1≤8.900.

ing lens further satisfies the following combinations, it is beneficial to design an optical imaging lens that can image 940 nm infrared light, with small volume, high forming yield and low cost. The preferable ranges are 1.300≤T1/T2≤3.700 and 25.000 degrees≤HFOV*T1/ImgH≤62.000 degrees.

3. The embodiment of the optical imaging lens further satisfies the relationship of 0.600≤V2/V1, which is favorable for imaging 940 nm infrared light, and the preferable range is 0.600≤V2/V1≤2.000.

4. The optical imaging lens of the present invention further satisfies the following relationships in the table 1, which helps to maintain the effective focal length and optical parameters at an appropriate value, and avoids that any parameter is too large to image 940 nm infrared light, or that any parameter is too small to affect assembly or improve manufacturing difficulty.

TABLE 1

| Relationships | Preferable range |
|---|---|
| (T2 + EFL)/BFL ≤ 2.500 | 0.900 ≤ (T2 + EFL)/BFL ≤ 2.500 |
| (EFL + D12t22)/BFL ≤ 2.700 | 1.000 ≤ (EFL + D12t22)/BFL ≤ 2.700 |
| 2.600 ≤ EFL/ER11 | 2.600 ≤ EFL/ER11 ≤ 3.600 |
| Fno*(EFL + ImgH)/T1 ≤ 6.100 | 2.300 ≤ Fno*(EFL + ImgH)/T1 ≤ 6.100 |

5. The optical imaging lens of the present invention further satisfies the following relationships in the table 2, which helps to maintain the thickness and gaps of each lens element at an appropriate value, and avoids that any parameter is too large to be detrimental to the overall thinning of the optical imaging lens, or that any parameter is too small to affect the assembly or improve the manufacturing difficulty.

TABLE 2

| Relationships | Preferable range |
|---|---|
| 25.000 degrees ≤ HFOV*T1/ImgH | 25.000 degrees ≤ HFOV*T1/ImgH ≤ 62.000 degrees |
| 12.000 degrees ≤ HFOV*T1/(ImgH*Fno) | 12.000 degrees ≤ HFOV*T1/(ImgH*Fno) ≤ 41.000 degrees |
| TTL/EPD ≤ 3.650 | 2.300 ≤ TTL/EPD ≤ 3.650 |
| TL/EPD ≤ 2.300 | 1.000 ≤ TL/EPD ≤ 2.300 |
| ALT/EPD ≤ 2.300 | 0.900 ≤ ALT/EPD ≤ 2.300 |
| TL/ER12 ≤ 2.500 | 1.200 ≤ TL/ER12 ≤ 2.500 |
| TL/ER21 ≤ 2.600 | 0.900 ≤ TL/ER21 ≤ 2.600 |
| TL/ER22 ≤ 2.600 | 0.800 ≤ TL/ER22 ≤ 2.600 |
| Fno*(D12t22 + T2)/BFL ≤ 2.400 | 0.600 ≤ Fno*(D12t22 + T2)/BFL ≤ 2.400 |
| 1.100 ≤ (ER22 + ER12)/(ER21 + ER11) | 1.100 ≤ (ER22 + ER12)/(ER21 + ER11) ≤ 1.700 |
| 70.000 degrees ≤ HFOV*T1/T2 | 70.000 degrees ≤ HFOV*T1/T2 ≤ 180.000 degrees |
| 22.500 degrees ≤ HFOV*T1/D12t22 | 22.500 degrees ≤ HFOV*T1/D12t22 ≤ 90.000 degrees |
| 14.000 degrees ≤ HFOV*ER11/D12t22 | 14.000 degrees ≤ HFOV*ER11/D12t22 ≤ 36.000 degrees |

(3) Fno*(G1+T2+BFL)/T1≤4.100 and 0.600≤V2/V1, and the preferable range is 1.400≤Fno*(G1+T2+BFL)/T1≤4.100 and 0.600≤V2/V1≤2.000.

2. The optical imaging lens satisfies one of the relationships of the optical axis region 26 of the image-side surface 22 of the second lens element 20 is concave, the periphery region 24 of the object-side surface 21 of the second lens element 20 is concave, and the optical axis region 16 of the image-side surface 12 of the first lens element 10 is concave or the periphery region 27 of the image-side surface 22 of the second lens element 20 is convex, T1/T2≥1.300 and HFOV*T1/ImgH≥25.000 degrees. And if the optical imag- By observing three representative wavelengths of lights in each embodiment of the present invention, it is suggested off-axis light of different heights of every wavelength all concentrates on the image plane, and deviations of every curve also reveal that off-axis light of different heights are well controlled so the embodiments do improve the spherical aberration, the astigmatic aberration and the distortion aberration. In addition, by observing the imaging quality data the distances amongst the three representing different wavelengths of lights are pretty close to one another, which means the embodiments of the present invention are able to concentrate light of the three representing different wavelengths so that the aberration is greatly improved. Given the above, it is understood that the embodiments of the present invention provides outstanding imaging quality.

In addition, any arbitrary combination of the parameters of the embodiments can be selected to increase the lens limitation so as to facilitate the design of the same structure of the present invention.

In the light of the unpredictability of the optical imaging lens, the present invention suggests the above principles to have a shorter system length of the optical imaging lens, lower f-number, larger image height and better imaging quality or a better fabrication yield to overcome the drawbacks of prior art. And by use of plastic material for the lens element of the present invention can further reduce the weight and cost of the optical imaging lens.

In addition to the above ratios, one or more conditional formulae may be optionally combined to be used in the embodiments of the present invention and the present invention is not limit to this. The concave or convex configuration of each lens element or multiple lens elements may be fine-tuned to enhance the performance and/or the resolution. The above limitations may be selectively combined in the embodiments without causing inconsistency.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element and a second lens element, the first lens element and the second lens element each having an object-side surface facing toward the object side and allowing imaging rays to pass through as well as an image-side surface facing toward the image side and allowing the imaging rays to pass through, wherein:

a periphery region of the image-side surface of the first lens element is convex;

an optical axis region of the image-side surface of the second lens element is concave;

wherein lens elements included by the optical imaging lens are only the two lens elements described above, and the optical imaging lens satisfies the relationship: HFOV*T1/(ImgH*Fno)≥12.000 degrees, and T1/T2≥1.300, wherein HFOV is defined as a maximum half field of view of the optical imaging lens, T1 is a thickness of the first lens element along the optical axis, T2 is a thickness of the second lens element along the optical axis, ImgH is defined as a maximum image height of the optical imaging lens, and Fno is defined as a f-number of the optical imaging lens.

2. The optical imaging lens of claim 1, wherein the optical imaging lens further satisfies the relationship: 25.000 degrees≤HFOV*T1/ImgH.

3. The optical imaging lens of claim 1, wherein TTL is the distance from the object-side surface of the first lens element to an image plane along the optical axis, EPD is defined as an entrance pupil diameter of the optical imaging lens, and the optical imaging lens satisfies the relationship: TTL/EPD≤3.650.

4. The optical imaging lens of claim 1, wherein TL is a distance from the object-side surface of the first lens element to the image-side surface of the second lens element along the optical axis, ER12 is defined as an effective radius of the image-side surface of the first lens element, and the optical imaging lens satisfies the relationship: TL/ER12≤2.500.

5. The optical imaging lens of claim 1, wherein EFL is an effective focal length of the optical imaging lens, BFL is a distance from the image-side surface of the second lens element to an image plane along the optical axis, and the optical imaging lens satisfies the relationship: (T2+EFL)/BFL≤2.500.

6. The optical imaging lens of claim 1, wherein ER11 is defined as an effective radius of the object-side surface of the first lens element, ER12 is defined as an effective radius of the image-side surface of the first lens element, ER21 is defined as an effective radius of the object-side surface of the second lens element, ER22 is defined as an effective radius of the image-side surface of the second lens element, and the optical imaging lens satisfies the relationship: $1.100 \leq (ER22+ER12)/(ER21+ER11)$.

7. The optical imaging lens of claim 1, wherein the optical imaging lens further satisfies the relationship: $70.000$ degrees$\leq$HFOV*T1/T2.

8. An optical imaging lens, from an object side to an image side in order along an optical axis comprising: a first lens element and a second lens element, the first lens element and the second lens element each having an object-side surface facing toward the object side and allowing imaging rays to pass through as well as an image-side surface facing toward the image side and allowing the imaging rays to pass through, wherein:

a periphery region of the object-side surface of the second lens element is concave;

an optical axis region of the image-side surface of the second lens element is concave;

wherein lens elements included by the optical imaging lens are only the two lens elements described above, and the optical imaging lens satisfies the relationship: HFOV*T1/(ImgH*Fno)$\geq$12.000 degrees, and T1/T2$\geq$1.300, wherein HFOV is defined as a maximum half field of view of the optical imaging lens, T1 is a thickness of the first lens element along the optical axis, T2 is a thickness of the second lens element along the optical axis, ImgH is defined as a maximum image height of the optical imaging lens, Fno is defined as a f-number of the optical imaging lens.

9. The optical imaging lens of claim 8, wherein TL is a distance from the object-side surface of the first lens element to the image-side surface of the second lens element along the optical axis, EPD is defined as an entrance pupil diameter of the optical imaging lens, and the optical imaging lens satisfies the relationship: TL/EPD$\leq$2.300.

10. The optical imaging lens of claim 8, wherein TL is a distance from the object-side surface of the first lens element to the image-side surface of the second lens element along the optical axis, ER21 is defined as an effective radius of the object-side surface of the second lens element, and the optical imaging lens satisfies the relationship: TL/ER21$\leq$2.600.

11. The optical imaging lens of claim 8, wherein D12t22 is a distance from the image-side surface of the first lens element to the image-side surface of the second lens element along the optical axis, BFL is a distance from the image-side surface of the second lens element to an image plane along the optical axis, and the optical imaging lens satisfies the relationship: Fno*(D12t22+T2)/BFL$\leq$2.400.

12. The optical imaging lens of claim 8, wherein EFL is an effective focal length of the optical imaging lens, ER11 is defined as an effective radius of the object-side surface of the first lens element, and the optical imaging lens satisfies the relationship: 2.600$\leq$EFL/ER11.

13. The optical imaging lens of claim 8, wherein D12t22 is a distance from the image-side surface of the first lens element to the image-side surface of the second lens element along the optical axis, and the optical imaging lens satisfies the relationship: $22.500$ degrees$\leq$HFOV*T1/D12t22.

14. An optical imaging lens, from an object side to an image side in order along an optical axis comprising: a first lens element and a second lens element, the first lens element and the second lens element each having an object-side surface facing toward the object side and allowing imaging rays to pass through as well as an image-side surface facing toward the image side and allowing the imaging rays to pass through, wherein:

a periphery region of the image-side surface of the first lens element is convex;

an optical axis region of the image-side surface of the second lens element is concave;

wherein lens elements included by the optical imaging lens are only the two lens elements described above, and the optical imaging lens satisfies the relationship: Fno*(EFL+BFL+ImgH)/T1$\leq$8.900, and T1/T2$\geq$1.300, wherein Fno is defined as a f-number of the optical imaging lens, EFL is an effective focal length of the optical imaging lens, BFL is a distance from the image-side surface of the second lens element to the image plane along the optical axis, ImgH is defined as a maximum image height of the optical imaging lens, T1 is a thickness of the first lens element along the optical axis, T2 is a thickness of the second lens element along the optical axis.

15. The optical imaging lens of claim 14, wherein ALT is a sum of thicknesses of the two lens elements from the first lens element to the second lens element along the optical axis, EPD is defined as an entrance pupil diameter of the optical imaging lens, and the optical imaging lens satisfies the relationship: ALT/EPD$\leq$2.300.

16. The optical imaging lens of claim 14, wherein TL is a distance from the object-side surface of the first lens element to the image-side surface of the second lens element along the optical axis, ER22 is defined as an effective radius of the image-side surface of the second lens element, and the optical imaging lens satisfies the relationship: TL/ER22$\leq$2.600.

17. The optical imaging lens of claim 14, wherein D12t22 is a distance from the image-side surface of the first lens element to the image-side surface of the second lens element along the optical axis, and the optical imaging lens satisfies the relationship: (EFL+D12t22)/BFL$\leq$2.700.

18. The optical imaging lens of claim 14, wherein and the optical imaging lens satisfies the relationship: Fno*(EFL+ImgH)/T1$\leq$6.100.

19. The optical imaging lens of claim 14, wherein HFOV is defined as a maximum half field of view of the optical imaging lens, ER11 is defined as an effective radius of the object-side surface of the first lens element, D12t22 is a distance from the image-side surface of the first lens element to the image-side surface of the second lens element along the optical axis, and the optical imaging lens satisfies the relationship: $14.000$ degrees$\leq$HFOV*ER11/D12t22.

* * * * *